United States Patent [19]

Taller

[11] 3,919,174

[45] Nov. 11, 1975

[54] SINGLE PACKAGE 100 PERCENT SOLIDS URETHANE COATING COMPOSITIONS

[75] Inventor: Robert Arthur Taller, Charleston, W. Va.

[73] Assignee: Union Carbide Corporation, New York, N.Y.

[22] Filed: July 26, 1974

[21] Appl. No.: 492,278

[52] U.S. Cl. ............... 260/77.5 AB; 260/77.5 AT; 260/77.5 AA; 260/77.5 AN
[51] Int. Cl.² .................................... C08G 18/24
[58] Field of Search ............ 260/77.5 AB, 77.5 AA, 260/77.5 AT, 77.5 AN

[56] References Cited
UNITED STATES PATENTS 3,510,456   5/1970   Carr et al. ............... 260/77.5 AP
3,639,355   2/1972   Wooster et al. ............ 260/77.5 AP

OTHER PUBLICATIONS

Comstock et al., Product Licensing Index & Research Disclosures, No. 10103, Hampshire, England, Sept. 10, 1972, p. 5.

Primary Examiner—M. J. Welsh
Attorney, Agent, or Firm—F. M. Fazio

[57] ABSTRACT

A single package liquid 100 percent solids composition of extended potlife containing an organic polyisocyanate, a polyol, a dialkyl tin diacylate catalyst and an organic carboxylic acid.

20 Claims, No Drawings

SINGLE PACKAGE 100 PERCENT SOLIDS URETHANE COATING COMPOSITIONS

BACKGROUND OF THE INVENTION

Many urethane coating compositions are known that are used on fabrics to produce the so-called wet look. These thermoplastic coatings are generally supplied as solutions of a preformed polyurethane, the reaction product of an isocyanate and a polyol, for direct application to the fabric followed by evaporation of the solvent to leave a continuous uniform film of the polymer on the fabric. Such compositions, however, have the disadvantage of low solids content and atmospheric pollution as the solvent is removed. In another form, the urethane coatings are supplied as two-package systems, with or without a solvent present therein. In this form, the isocyanate is present in one of the packages and the polyol is present in the other and the two are mixed together immediately before they are applied to the fabric or substrate. Such two-package solventless systems, however, have several disadvantages, the finished coating is generally of inferior quality when compared to solution compositions, the reactant components may be too viscous for ready handling and control of stoichiometry and unless the mixed reactants are immediately applied to the fabric the mixture of the two components may gel and become worthless. Further, production of desired thin films is hampered because of the high reactant mixtures viscosities in the solventless systems.

It is known in the art that one cannot readily mix an isocyanate with a polyol and obtain a stable composition of sufficient potlife so that it can be used within a reasonable period of time. Generally, attempts to prepare such mixtures have resulted in reaction within a matter of minutes. In addition, gel particles form that deposit on the substrate and detract from the appearance of the finished product.

SUMMARY OF THE INVENTION

It has now been found that single package liquid 100 percent solids compositions useful as coating or adhesives and having extended potlife can be produced containing an organic polyisocyanate, a poly(caprolactone) polyol, or polyether polyol or polyester polyol, a dialkyl tin diacylate catalyst and an organic carboxylic acid; the composition can also contain an alkylene glycol or a mixture of an alkylene glycol and an alkanolamine if desired. Such compositions have a potlife which is of many fold longer duration than has heretofore been obtainable. These one package solventless compositions are relatively stable at room temperature for periods extending up to about 1.5 hours and cure rapidly once the coating has been heated to at least 150°C. In some instances, curing can be achieved at slightly lower temperatures over a longer period of time. Previous hereto, solventless compositions could be prepared that suffered many defects, e.g., they generally had a potlife of from 1 to 5 minutes and were thus difficult to use in commercial production facilities.

DESCRIPTION OF THE INVENTION

The organic polyisocyanate present in the single package liquid 100 percent solids composition can be any of the known aliphatic or aromatic polyisocyanates used in the polyurethane art. These are well known to those skilled in the art and include, for example, tolylene diisocyanate, 2,6-tolylene diisocyanate, 4,4'-methylenebis(cyclohexylisocyanate), isophorone diisocyanate, 2,6-dimethylcyclohexyl diisocyanate, 4,4'-methylenebis(phenyleneisocyanate), 2,2,4-trimethylpentane diisocyanate, trimethylhexamethylene diisocyanate, m-xylylene diisocyanate, and the like. Any of the known diisocyanates can be used and the above are merely illustrative thereof.

The polyol present in the single package liquid 100 percent solids composition is a polyol having an average molecular weight of from about 300 to about 4,000 having from 2 to about 6 hydroxyl groups, preferably from about 300 to 3,000 with from 2 to 3 hydroxyl groups in the molecule.

Among the polyols that can be used are any of the known poly(caprolactone) polyols, polyether polyols, such as the poly(alkyleneoxy) polyether polyols in which the alkyleneoxy group has from 2 to about 5 carbon atoms and which can be homopolymeric or copolymeric, either random, block or graft, or polyesters polyols. These are sold commercially and are well known to those skilled in the art; hence, do not require further description. They can be used in the compositions individually or in mixtures of any desired concentrations of each polyol. Illustrative thereof are the poly(ethyleneoxy) polyols, poly(propyleneoxy) polyols, copoly(ethyleneoxy-propylenoxy) polyols, polycaprolactone polyols, and the like. The composition can also contain up to 90 mole percent, of the total polyols present, of an alkylene glycol having from 2 to about 12 carbon atoms or a mixture of an alkylene glycol and an alkanolamine having from 2 to 12 carbon atoms of the structure HORNH$_2$ in which R is the alkylene group. Illustrative thereof one can mention, ethylene glycol, propylene glycol, 1,4-butane diol, 1,3-butane diol, 1,6-hexane diol, decane diol dodecane diol, monoethanolamine, N-methylisopropanolamine, and the like.

The catalyst present in the single package liquid 100 percent solids composition is a dialkyl tin diacylate in which the alkyl group contain from about 2 to about 8 carbon atoms, preferably from about 4 to 6 carbon atoms, and the acylate group contains from 2 to about 20 carbon atoms, preferably from about 8 to about 16 carbon atoms. The catalyst is one which is preferably soluble in the composition and it is present at a concentration of from about 0.001 to 0.5 weight percent of the composition, preferably from about 0.003 to 0.1 weight percent. Illustrative thereof one can mention, dibutyltin diacetate, dibutyltin dilaurate, dihexyltin dilaurate, and the like; other specific dialkyltin diacylates are well known in the art.

The single package liquid 100 percent solids composition also contains from about 0.05 to 3 weight percent, preferably from about 0.1 to 1.5 weight percent of an organic carboxylic acid having from 1 to 15 carbon atoms, preferably from 2 to about 6 carbon atoms. Illustrative thereof one can mention, formic acid, acetic acid, propionic acid, isopropionic acid, 2-ethylhexanoic acid, butyric acid, lauric acid, acrylic acid, and the like; the carboxylic acids are well known organic compounds.

The mole ratio of dialkyl tin diacylate to organic carboxylic acid is from about 0.001:1 to about 0.1:1, preferably 0.003:1 to about 0.05:1.

The compositions of this invention can also contain other additives normally present in such polyurethane compositions such as, pigments, leveling agents, flow control agents, slip agents, and the like. These components are selected as being those that will not interfere with the reaction and they are added in the conventional amounts. Those skilled in the art are fully familiar with the materials and of the quantities used, hence, there is no need for an elaborate discussion or description thereof at this point.

The 100 percent solids compositions are prepared by conventional mixing of the components at about room temperature. If desired, one can heat slightly to facilitate dissolution, however, the mixtures should not be kept at elevated temperature for any period of time since it will accelerate the reaction and shorten the potlife. It is preferred that the temperature not exceed about 60°C. during this mixing. The ability to heat such systems without obtaining a rapid pot cure was completely unexpected and unobvious. The single package compositions of this invention can be used directly as coatings or adhesives and they have been found to have a sufficiently long potlife so that they can be applied to the fabric or substrate over a period of time rather than a few minutes. Thus, the extended potlife of these compositions can range up to about 90 minutes. In comparison, previously available compositions had potlifes of not more than several minutes. Further, since the compositions of this invention do not have a solvent present, there is no atmospheric pollution caused by solvent evaporation. The compositions are less viscous than previously available materials and they are readily applied, cure rapidly, and produce excellent films.

It has been found that the extended potlife of these single package liquid 100 percent compositions is achieved only by the use of the dialkyl tin diacylate catalysts and not when one is using other known urethane catalysts. Thus, experiments have shown that stannous octoate and nickel acetylacetonate, two well known polyurethane catalysts, do not extend the potlife when they are used in conjunction with the organic acid. In this application the potlife is considered as that time period up to the first sign of haze in the composition. Though haze may be noticed, the composition can still be used subsequent thereto until it becomes too thick to handle and apply properly.

The single package liquid 100 percent solids compositions are used to coat fabrics in accordance with the procedures conventionally employed in commercial operations. They have found to be as good as previously available materials, solution coatings or two-package systems, and are less wasteful of material.

The following examples further serve to illustrate the invention. Parts and percentages are by weight unless otherwise specified.

EXAMPLE 1

To 268.7 grams of molten polycaprolactone diol having an average molecular weight of 2,000 there was added at 50°C. 106.8 grams of 4,4'-methylenebis(cyclohexylisocyanate) and 24.5 grams of 1,4-butanediol; this gives an equivalent ratio of 1/3/2. The components were mixed together in a reactor and to keep the coating fluid and to reduce exotherm the mixture was maintained in a 45°C. water bath. When 0.015 grams of dibutyltin dilaurate was added to 100 grams of the above solventless mixture, the coating had a short usable potlife of between 12 and 15 minutes. Films were cast on gelatin coated glass plates and cured 10 minutes at 150°C. The free films were clear and flexible. This shows the average short potlife of the unstabilized composition (Control I).

When both 0.015 gram of dibutyltin dilaurate and 0.75 gram of glacial acetic acid were added to 100 grams of the solventless composition described above, the usable potlife of this stabilized composition increased to 85 minutes. Films were cast on gelatin coated glass plates and cured 10 minutes at 150°C. The free films were clear and flexible (Composition A).

For further comparative purposes a thermoplastic film was prepared by the solvent prepolymer method using the same polycaprolactone diol, isocyanate, and 1,4-butanediol in the same equivalent ratio of 1/3/2. The solution of this preformed polyurethane contained 25 percent solids in a 50/50 methyl ethyl ketone/dimethylformamide blend. It was cast and dried under the same conditions (Control II).

Tensile properties and potlife are set forth below.

|  | Comp. A | Control I | Control II |
|---|---|---|---|
| Potlife, min. | 85 | 12–15 | — |
| Modulus, psi |  |  |  |
| 100% | 737 | 714 | 618 |
| 300% | 1,706 | 1,478 | 1,277 |
| Tensile strength, psi | 6,378 | 3,865 | 5,322 |
| Elongation, % | 546 | 583 | 623 |

EXAMPLE 2

The potlives of single package solventless coatings prepared using the same equivalent weight ratios of polycaprolactone polyol, polyisocyanate and 1,4-butanediol described in Example 1 were determined at various concentrations of dibutyltin dilaurate catalyst with 0.75 weight percent and without any glacial acetic acid present. Clear films were prepared and cured from all six systems. The results are summarized below.

| Dibutyltin dilaurate Wt. % | Potlife (minutes) Without Acetic Acid | With Acetic Acid |
|---|---|---|
| 0.01 | 24 | 46 |
| 0.015 | 15 | 40 |
| 0.03 | 11 | 36 |

The data shows the unexpected increase in potlife obtained by the use of the acetic acid. All of the films cured to dry coatings.

In contradistinction, the use of stannous octoate in conjunction with acetic acid produced compositions that failed to cure when baked 10 minutes at 150°C. These compositions containing 0.01, 0.015, 0.03, 0.05 and 0.1 percent stannous octoate and 0.75 percent acetic acid had, respectively, potlives of 50, 42, 34, 21 and 10 minutes. Further, it was also found that while compositions containing the stated amounts of stannous octoate but no acetic acid had longer potlives, 480, 480, 480, 300 and 28 minutes, respectively, but the films failed to cure. The use of acetic acid to prolong the potlife and still obtain a satisfactory dry coating appears to be feasible with dialkyl tin diacylate catalysts such as dibutyl tin dilaurate but is not suitable with stannous octoate.

EXAMPLE 3

To evaluate the effect of a mixture of dibutyl tin dilaurate and stannous octoate catalysts with and without acetic acid, the single package composition of Example 1 was used. It was found that in the presence of 0.015 weight percent of each catalyst the potlife without acetic acid was 8 minutes and the potlife with 0.75 percent acetic acid was 31 minutes. The cured, cast film had a 100% modulus of 737 psi, a 300% modulus of 1,705 psi, a tensile strength of 7,227 psi and an elongation of 546 percent. The experiment shows that the presence of other types of catalysts does not affect the potlife improving effect of the acetic acid in the single package liquid 100 percent solids composition.

EXAMPLE 4

A mixture of 473.8 grams of the same molten polycaprolactone polyol, 184.1 grams of the same diisocyanate and 42.1 grams of 1,4-butanediol of Example 1 was mixed in a reactor at 45°C. and then kept at ambient temperature. To one half of the sample there was added 0.015 percent dibutyltin dilaurate (Control I) and to the other half there were added 0.015 percent dibutyltin dilaurate and 0.75 percent glacial acetic acid (Composition A). The potlife, viscosity and cure characteristics of Composition A of this invention reveal that the solventless coating after being mixed at approximately 45°C. can be maintained and used at ambient temperature and that its potlife was three times that of the control. The results are set forth below together with properties of cast films cured at 150°C. for 10 minutes.

|  | A | I |
| --- | --- | --- |
| Potlife, min. | 45 | 15 |
| Viscosity, cps, initial | 600 | 660 |
| final | 1,400 | 1,520 |
| Modulus, psi |  |  |
| 100% | 798 | 757 |
| 300% | 1,972 | 1,940 |
| Tensile strength, psi | 5,919 | 5,312 |
| Elongation, % | 493 | 470 |

EXAMPLE 5

To 197.8 grams of molten (60°C) polycaprolactone diol having an average molecular weight of 1,250, there were added 123.8 grams of 4,4'-methylenebis-(cyclohexylisocyanate) and 28.4 grams of 1,4-butanediol and the mixture was stirred to homogeneity and stored at ambient temperature. To one half of the sample there was added 0.015 percent of dibutyltin dilaurate (Control I) and to the other half was added a mixture of 0.015 percent of dibutyltin dilaurate and 0.75 percent of glacial acetic acid (Composition A). The coating potlife, viscosity and cure characteristics of Composition A indicate that the solventless coating has a much longer potlife than the control that has no acetic acid present therein. The potlife times and properties of cast films cured at 150°C. for 10 minutes are set forth below.

|  | A | I |
| --- | --- | --- |
| Potlife, min. | 70 | 30 |
| Viscosity, cps, initial | 210 | 200 |
| final | 6,000 | 12,800 |
| Modulus, psi |  |  |
| 100% | 1,341 | 1,237 |

-continued

|  | A | I |
| --- | --- | --- |
| 300% | 2,843 | 2,939 |
| Tensile strength, psi | 5,263 | 7,128 |
| Elongation, % | 357 | 443 |

EXAMPLE 6

To 176.6 grams of a 75/25 mixture of a polycaprolactone diol having an average molecular weight of 1,200 and a polycaprolactone triol having an average molecular weight of 800, there were added 141.1 grams of 4,4'-methylenebis(cyclohexylisocyanate) and 32.3 grams of 1,4-butanediol and the mixture was stirred to homogeneity and stored at ambient temperature. To the sample there were added 0.015 percent of dibutyltin dilaurate and 0.75 percent of glacial acetic acid. The coating potlife was 45 minutes. It had an initial bulk viscosity of 180 cps and a final viscosity of 2,240 after the 45 minute potlife period. A cast film cured at 150°C. for 10 minutes had a 100 percent modulus of 1,800 psi, a tensile strength of 6,266 psi and an elongation of 250 percent. This examples illustrates that even in the presence of a crosslinking triol the potlife was extended.

EXAMPLE 7

To 198.1 grams of molten polycaprolactone diol having an average molecular weight of 1,200, there were added 124.1 grams of 4,4'-methylenebis(cyclohexylisocyanate) and 27.8 grams of a 95/5 weight mixture of 1,4-butanediol and monoethanolamine. After stirring until homogeneous the composition was maintained at ambient temperature. To the coating composition there were added 0.015 percent by weight of dibutyltin dilaurate and 0.75 percent by weight of glacial acetic acid. The coating had a 60 minute potlife and an initial viscosity of 240 cps and a final viscosity of 1,320 cps. Cast film cured at 150°C. for 10 minutes prepared with the coatings containing both monoethanolamine and 1,4-butanediol indicate that single package liquid 100 percent solids solventless coatings containing the very reactive amine group have extended potlife and they can be maintained and used at ambient temperatures. The cast films had a 100 percent modulus of 1,063 psi, a 300 percent modulus of 2,646, a tensile strength of 6,780 psi and an elongation of 426%.

EXAMPLE 8

To 67.6 grams of molten polycaprolactone diol having an average molecular weight of 2,000, there were added 26.3 grams of 4,4'-methylenebis(cyclohexylisocyanate) and 6.1 grams of 1,4-butanediol. After stirring to homogeneity the composition was divided into separate portions and varying amounts of dibutyltin dilaurate (DBTDL) or dibutyltin dilaurate plus acetic acid were added to each portion to determine the effect of varying the catalyst concentration but maintaining the acetic acid content constant on the potlife and viscosity of the composition. In addition, the properties of films cast 5 minutes after mixing and curing at 150°C. were also determined. The results are set forth below.

| Run | 1 | 2 | 3 | 4 | 5 | 6 |
|---|---|---|---|---|---|---|
| DBTDL, % | 0.015 | 0.015 | 0.03 | 0.03 | 0.05 | 0.05 |
| Acetic acid, % | 0 | 0.75 | 0 | 0.75 | 0 | 0.75 |
| Potlife, minutes | 15 | 60 | 5 | 45 | 4 | 25 |
| Viscosity, cps, initial | 648 | 480 | — | 480 | — | 480 |
| final | 2,240 | 1,360 | 18,200 | 2,000 | gel | 780 |
| Modulus, psi | | | | | | |
| 100% | — | 953 | — | 594 | — | 680 |
| 200% | — | 1,724 | — | 1,303 | — | 1,647 |
| Tensile strength, psi | — | 2,936 | — | 3,318 | — | 6,192 |
| Elongation, % | — | 366 | — | 556 | — | 523 |

Although the coating containing 0.015 percent by weight of catalyst provided the longest potlife, tensile results show that films cast 5 minutes after mixing have relatively low tensile properties. The data indicates that at the glacial acetic acid concentration of 0.75 percent, a concentration somewhere between 0.03 and 0.05 dibutyltin dilaurate is required to provide adequate tensile strength when films are cast 5 minutes after the coating composition is prepared. At this catalyst level the tensile properties of films prepared from the single package compositions of this invention compare favorably with the film cast from a solution of preformed polyurethane; compare to Control II of Example 1.

The data also shows the lower viscosities of the compositions of this invention as compared to similar compositions that do not contain the organic acid stabilizer. It is to be noted that Run 5 had a potlife of only 4 minutes and that it then gelled; in comparison the equivalent Run 6 of this invention had a potlife, as previously defined, of 25 minutes and that it thereafter had a viscosity of only 780 cps, permittng one to continue to use the mixture for an additional period of time.

Similar results are obtained by substitution of propionic acid for the acetic acid in the composition.

EXAMPLE 9

In this example the concentration of acetic acid was varied and the amount of catalyst was held constant. A single package liquid 100 percent solids composition was produced by adding 170.9 grams of 4,4'-methylenebis(cyclohexylisocyanate) and 39.2 grams of 1,4-butanediol to 439.9 grams of molten polycaprolactone diol having an average molecular weight of 2,000 and stirring to homogeneity. The composition was divided into nine samples. To each sample was added 0.05 percent by weight dibutyltin dilaurate. Various concentrations of glacial acetic acid were added to the samples and the potlife determined. The potlife was called the point at which the coating became cloudy; the point of gelatin was also noted. It should be noted that even though some films were cloudy when cast after the indicated potlife period the cured films were clear and they have the required tensile properties.

| Sample | Acetic Acid % | Potlife, minutes Cloud Point | Gel Point |
|---|---|---|---|
| 1 | 0.10 | 9 | 21 |
| 2 | 0.25 | 18 | 48 |
| 3 | 0.50 | 26 | 62 |
| 4 | 0.75 | 30 | 85 |
| 5 | 1.0 | 36 | 98 |
| 6 | 1.25 | 37 | 101 |
| 7 | 1.5 | 30 | 95 |
| 8 | 2.0 | 29 | 96 |
| 9 | 3.0 | 23 | 91 |

The data indicates that the concentration of acetic acid used affects the potlife and should be optimized for each level of dibutyltin dilaurate. At higher concentrations the acid appears to lose its effectiveness and no longer extends the potlife to the same extent as it does within the defined range.

Similar results are obtained substituting diethylene glycol for the 1,4-butanediol.

EXAMPLE 10

To 68.9 grams of molten polyester polyol having an average molecular weight of about 2,000, there were added 25.3 grams of 4,4'-methylenebis(cyclohexylisocyanate) and 5.8 grams of 1,4-butanediol and the composition was stirred until homogeneous and then held at room temperature. The polyester polyol was the reaction product of 1,6-hexane diol and adipic acid. A single package liquid 100 percent solids composition was produced by adding 0.05 percent dibutyltin dilaurate and 0.75 percent acetic acid. Coatings were cast at various times and cured at 150°C. for 10 minutes. The stabilized composition had a potlife of 25 minutes and set-up to a gel in 75 minutes. The data is set forth below.

| Casting time, min. | 4 | 25 |
|---|---|---|
| Viscosity, cps | 1,100 | 3,280 |
| Modulus, psi | | |
| 100% | 584 | 639 |
| 300% | 917 | 997 |
| Tensile strength, psi | 4,614 | 5,182 |
| Elongation, % | 643 | 686 |

Similar extended potlife times were obtained using two other commercially available polyester polyols.

EXAMPLE 11

A liquid single package 100 percent solids composition was produced by mixing 67.6 grams of poly(propyleneoxy) diol having an average molecular weight of about 2,000, 26.3 grams of 4,4'-methylenebis(cyclohexylisocyanate) and 6.1 grams of 1,4-butanediol until homogeneous and then adding 0.05 percent dibutyltin dilaurate and 0.75 percent of acetic acid. The composition had a potlife of 18 minutes and set-up a gel in 110 minutes. In comparison a composition containing catalyst but no acetic acid gelled within several minutes after the addition of the catalyst. Good film coatings were obtained from the composition of this invention.

EXAMPLE 12

A liquid single package 100 percent solids composition was produced by mixing 67 grams of poly(tetramethyleneoxy) diol having an average molecular weight of 2,000, 26.8 grams of 4,4'-methylenebis(cyclohexylisocyanate) and 6.2 grams of 1,4-butanediol until homogeneous and then adding 0.05 percent dibutyltin dilaurate and 0.75 percent acetic acid. Films were cast at various times on gelatin coated glass plates and cured at 150°C. for 10 minutes. The composition had a potlife of 19 minutes. In the absence of the acetic acid, the same composition gelled within several minutes after the addition of the catalyst. The film properties and composition viscosity data are set forth below.

| Casting time, min. | 1 | 11 | 19 |
|---|---|---|---|
| Viscosity, cps | 460 | 960 | 2,040 |
| Modulus, psi | | | |
| 100% | 711 | 660 | 724 |
| 300% | 1,304 | 1,357 | 1,379 |
| Tensile strength, psi | 5,247 | 5,266 | 7,087 |
| Elongation, % | 533 | 460 | 540 |

Similar extended potlife times and film properties were obtained using two other commercially available poly(tetramethyleneoxy)diols of 1,000 and 650 average molecular weights.

EXAMPLE 13

A liquid single package 100 percent solids composition was produced by mixing 66.9 grams of a poly(epsiloncaprolactone/ethylene glycol/adipic acid) polyol having an average molecular weight of 2,000, 26.9 grams of 4,4'- methylenebis (cyclohexylisocyanate) and 6.2 grams of 1,4 - butanediol until homogeneous and then adding 0.05 percent dibutyltin dilaurate and 0.75 percent glacial acetic acid. The composition had a potlife of 18 minutes and set-up to a gel in 65 minutes; in comparsion, the same composition without the acetic acid gelled within several minutes. Films were cast at various times and cured at 150° C. for 10 minutes; all of them had satisfactory tensile properties.

EXAMPLE 14

A liquid single package 100 percent solids composition was produced by mixing 66.4 grams of molten polycaprolactone diol having an average molecular weight of 2,000, 25.8 grams of 4,4'- methylenebis (cyclohexylisocyanate), and 7.8 grams of 1,6- hexanediol until homogeneous and then adding 0.05 percent dibutyltin dilaurate and 0.75 percent glacial acetic acid. The composition had a potlife of 45 minutes and set-up to a gel in 112 minutes. In comparison, the same composition without the acetic acid gelled in several minutes. The viscosity of our composition was 600 cps after 3 minutes 840 cps after 15 minutes, 1,860 cps after 25 minutes and 2,760 cps after 45 minutes; satisfactory cast and cured films were obtained.

Similar compositions were prepared substituting ethylene glycol and 1,10-decanediol for the 1,6- hexanediol. The cast films from these compositions had suitable properties and the potlife of each composition was much longer than the same composition without the acetic acid. It did, however, vary with the particular diol present, but in all instances it was much longer than that of the organic acid free composition.

EXAMPLE 15

A liquid single package 100 percent solids composition was produced by mixing 70.5 grams of molten polycaprolactone diol having an average molecular weight of 2,000, 23.2 grams of isophorone diisocyanate and 6.3 grams of 1,4- butanediol until homogeneous and then adding 0.05 percent of dibutyltin dilaurate and 0.75 percent of glacial acetic acid. The composition had a potlife of 70 minutes and set-up to a gel in 130 minutes. In comparison, the same composition without the acetic acid gelled within several minutes. Cast films cured at 150° C. for 10 minutes had good tensile properties.

EXAMPLE 16

A liquid single package 100 percent solids composition was produced by mixing 67.8 grams of molten polycaprolactone diol having an average molecular weight of 2,000, 26.3 grams of 4,4'- methylenebis (cyclohexylisocyanate) and 5.9 grams of a 95/5 blend of 1,4-butanediol and monoethanolamine until homogeneous and then adding 0.05 percent dibutyltin dilaurate and 0.75 percent glacial acetic acid. The composition had a potlife of 28 minutes and set-up to a gel in 102 minutes. In comparison, the same composition without the acetic acid gelled within five minutes. Films were cast at various times and cured at 150° C. for 10 minutes. The solution viscosities and film properties are set forth below.

| Casting time, min | 1 | 3 | 5 | 15 | 25 |
|---|---|---|---|---|---|
| Viscosity, cps | — | 480 | — | 940 | 2,750 |
| Modulus, psi | | | | | |
| 100% | 682 | 643 | 607 | 617 | — |
| 300% | 1,642 | 1,509 | 1,536 | 1,543 | — |
| Tensile strength, psi | 8,061 | 7,289 | 7,276 | 8,130 | — |
| Elongation, % | 570 | 576 | 560 | 556 | — |

EXAMPLE 17

A liquid single package 100 percent solids composition was produced by mixing 57.1 grams of a molten polycaprolactone diol having an average molecular weight of 830, 36.6 grams of 4,4'- methylenebis (cyclohexylisocyanate) and 6.3 grams of 1,4 - butanediol until homogeneous and then 0.05 percent dibutyltin dilaurate and 0.75 percent glacial acetic acid were added. The composition had a potlife of 31 minutes and set-up a gel in 84 minutes. In comparison, the same composition without the acetic acid gelled within several minutes. The viscosity of our composition, which had a polyol/isocyanate/diol ratio of 1/2/1, was 220 cps after 3 minutes, 510 cps after 15 minutes and 670 cps after 25 minutes.

EXAMPLE 18

A liquid single package 100 percent solids composition was produced by mixing 66.2 grams of molten polycaprolactone diol having an average molecular weight of 2,000; 27.9 grams of polymethylene polyphenylisocyanate and 5.9 grams of 1,4 - butanediol until homogeneous and then adding 0.003 percent dibutyltin dilaurate and 0.05 percent glacial acetic acid. The composition had a potlife of 5 minutes and produced clear, cast films of good tensile properties. In comparison, the same composition without the acetic acid had a potlife of only one minute and the films obtained therefrom were cloudy.

EXAMPLE 19

A liquid single package 100 percent solids composition was produced by mixing 74.2 grams of molten polycaprolactone diol having an average molecular weight of 2,000; 19.2 grams of mixed 2,4 - and 2,6- tolylene diisocyanate and 6.6 grams of 1,4- butanediol until homogeneous and then adding 0.015 percent dibutyltin dilaurate and 0.25 percent glacial acetic acid. This composition had a potlife of 16 minutes and set-up to a gel in 55 minutes; it produced good cast and cured films. In comparison, the same composition without the acetic acid present had a potlife of only 3 minutes (viscosity of 28,500 cps) and set-up to a gel in 6 minutes.

What is claimed is:

1. A single package liquid 100 percent solids composition of extended potlife consisting essentially of:
   I. an organic polyisocyanate;
   II. a polyol comprising
      a. from about 10 to about 100 mole percent of a polycaprolactone polyol, polyether polyol or polyester polyol having an average molecular weight of from about 300 to about 4,000 and containing from 2 to 6 hydroxyl groups and,
      b. from 0 to about 90 mole percent of an alkylene glycol of from 2 to 12 carbon atoms or a mixture of an alkylene glycol and an alkanolamine of from 2 to 12 carbon atoms;
   III. from about 0.001 to about 0.5 weight percent of a dialkyltin diacylate catalyst in which the alkyl group contains from 2 to 8 carbon atoms and the acylate group contains from 2 to 20 carbon atoms and which is soluble in said coating composition; and
   IV. from about 0.05 to about 3 weight percent of an organic carboxylic acid having from 1 to about 15 carbon atoms,
wherein the mole ratio of III to IV is from about 0.001:1 to about 0.1:1.

2. A single package liquid 100 percent solids composition as claimed in claim 1, wherein said polyol II (a) has an average molecular weight of from about 300 to 3,000 and contains from 2 to 3 hydroxyl groups.

3. A single package liquid 100 percent solids composition as claimed in claim 1, wherein said dialkyltin diacylate III is a compound in which the alkyl group contains from 4 to 6 carbon atoms and the acylate group contains from 8 to 16 carbon atoms.

4. A single package liquid 100 percent solids composition as claimed in claim 1, wherein said organic carboxylic acid IV has from 2 to 6 carbon atoms.

5. A single package liquid 100 percent solids composition as claimed in claim 1, wherein said dialkyltin diacylate III is present at a concentration of from about 0.003 to about 0.1 weight percent.

6. A single package liquid 100 percent solids composition as claimed in claim 3, wherein said dialkyltin diacylate III is present at a concentration of from about 0.003 to about 0.1 weight percent.

7. A single package liquid 100 percent solids composition as claimed in claim 1, wherein said organic carboxylic acid IV is present at a concentration of from about 0.1 to about 1.5 weight percent.

8. A single package liquid 100 percent solids composition as claimed in claim 4, wherein said organic carboxylic acid IV is present at a concentration of from about 0.1 to about 1.5 weight percent.

9. A single package liquid 100 percent solids composition as claimed in claim 1, wherein the mole ratio of III to IV is from about 0.003:1 to about 0.05:1.

10. A single package liquid 100 percent solids composition as claimed in claim 1, wherein said polyol II(a) is a polycaprolactone polyol.

11. A single package liquid 100 percent solids composition as claimed in claim 1, wherein said polyol II(a) is a poly (alkyleneoxy) polyether polyol.

12. A single package liquid 100 percent solids composition as claimed in claim 1, wherein said polyol II(a) is a polyester polyol.

13. A single package liquid 100 percent solids composition as claimed in claim 1, wherein said polyol II(a) is polycaprolactone diol.

14. A single package liquid 100 percent solids composition as claimed in claim 1, wherein said polyol II(a) is a poly (propyleneoxy) diol.

15. A single package liquid 100 percent solids composition as claimed in claim 1, wherein said polyol II(a) is poly (tetramethyleneoxy) diol.

16. A single package liquid 100 percent solids composition as claimed in claim 1, wherein said catalyst III is dibutyltin dilaurate.

17. A single package liquid 100 percent solids composition as claimed in claim 1, wherein said organic carboxylic acid IV is acetic acid.

18. A single package liquid 100 percent solids composition as claimed in claim 1, wherein said organic polyisocyanate I is 4,4'- methylenebis (cyclohexylisocyanate); said polyol II is a mixture of polycaprolactone diol and 1,4 - butanediol, said catalyst III is dibutylin dilaurate and said organic carboxylic acid IV is acetic acid.

19. A single package liquid 100 percent solids composition as claimed in claim 18, wherein said polyol II is a mixture of polycaprolactone diol, polycaprolactone triol and 1,4-butanediol.

20. A single package liquid 100 percent solids composition as claimed in claim 18, wherein said polyol II is a mixture of polycaprolactone diol, 1,4-butanediol and monoethanolamine.

* * * * *